United States Patent
Lai et al.

(10) Patent No.: US 7,382,376 B2
(45) Date of Patent: Jun. 3, 2008

(54) SYSTEM AND METHOD FOR EFFECTIVELY UTILIZING A MEMORY DEVICE IN A COMPRESSED DOMAIN

(75) Inventors: Jimmy Kwok Lap Lai, Vancouver (CA); Ardeshir Saghafi, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 445 days.

(21) Appl. No.: 11/097,927

(22) Filed: Apr. 1, 2005

(65) Prior Publication Data

US 2006/0232593 A1    Oct. 19, 2006

(51) Int. Cl.
*G06T 1/60* (2006.01)
*G06T 9/00* (2006.01)
*G09G 5/36* (2006.01)
*G06F 7/00* (2006.01)
*G06F 13/00* (2006.01)

(52) U.S. Cl. .............. 345/555; 345/530; 345/560; 708/203

(58) Field of Classification Search ........... 345/530, 345/555, 560, 768, 790; 348/461, 716, 718, 348/719; 369/48, 59; 531/534, 547, 555; 708/203, 247; 710/62, 65, 68; 713/400
See application file for complete search history.

(56) References Cited

U.S. PATENT DOCUMENTS

| | | | |
|---|---|---|---|
| 5,486,876 A * | 1/1996 | Lew et al. ................. 348/719 |
| 5,666,137 A | 9/1997 | Coelho et al. |
| 5,995,080 A | 11/1999 | Biro et al. |
| 6,108,285 A * | 8/2000 | Freeman et al. ............ 707/200 |
| 6,661,422 B1 * | 12/2003 | Valmiki et al. ............. 345/530 |
| 6,747,661 B1 | 6/2004 | Peterson |
| 2003/0206174 A1 * | 11/2003 | MacInnis et al. ........... 345/560 |
| 2006/0023952 A1 * | 2/2006 | Rai et al. ................... 382/232 |

\* cited by examiner

*Primary Examiner*—Xiao M. Wu
*Assistant Examiner*—Aaron M Guertin
(74) *Attorney, Agent, or Firm*—Mark P. Watson

(57) ABSTRACT

A system and method for effectively storing compressed information in an electronic device includes a memory device coupled to the electronic device for storing the compressed information. A compression module sequentially performs a forward write procedure to store first components of the compressed information. The forward write procedure begins at a top location of the memory device. The compression module concurrently performs a reverse write procedure to store second components and third components of the compressed information sequentially in an interlaced configuration. The reverse write procedure begins at a bottom location of the memory device.

21 Claims, 8 Drawing Sheets

SYSTEM AND METHOD FOR EFFECTIVELY UTILIZING A MEMORY DEVICE IN A COMPRESSED DOMAIN

BACKGROUND SECTION

1. Field of Invention

This invention relates generally to electronic display controller systems, and relates more particularly to a system and method for effectively utilizing a memory device in a compressed domain.

2. Description of the Background Art

Implementing effective methods for displaying electronic image data is a significant consideration for designers and manufacturers of contemporary electronic devices. However, effectively displaying image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced display operations may provide additional benefits to a system user, but may also place increased demands on the control and management of various device components. For example, an enhanced electronic device that effectively stores and displays compressed digital image data may benefit from an effective implementation because of the large amount and complexity of the digital data involved.

Due to growing demands on system resources and substantially increasing data magnitudes, it is apparent that developing new techniques for the display of electronic image data is a matter of concern for related electronic technologies. Therefore, for all the foregoing reasons, developing effective systems for displaying electronic image data remains a significant consideration for designers, manufacturers, and users of contemporary electronic devices.

SUMMARY

In accordance with the present invention, a system and method are disclosed for effectively utilizing a memory device in a compressed domain. In certain embodiments, a compression module of a display controller begins a forward write procedure by initializing a Y write pointer to a memory location at the top of a display buffer. The compression module then accesses an uncompressed Y data block from any appropriate source. The compression module performs a compression operation to compress the accessed Y data block to produce a compressed Y data block.

Next, the compression module stores the compressed Y data block at a memory location currently indicated by the Y write pointer. Then, the compression module updates the Y write pointer, depending upon the size of the compressed Y data block, to indicate a next available memory location in the Y data block sequence in the data buffer. The compression module next determines whether more Y data blocks remain in the current frame of image data. If more Y data blocks remain, then the forward write procedure returns to compress and store the additional compressed Y data blocks. The forward write procedure may then terminate.

In accordance with certain embodiments of the present invention, the compression module may concurrently perform a reverse write operation. The compression module begins the reverse write operation by initializing a U/V write pointer to a memory location at the bottom of the display buffer. The compression module then accesses an uncompressed U data block and an uncompressed V data block from any appropriate source. Next, the compression module performs compression operations to compress the accessed U data block and the accessed V data block.

The compression module stores the compressed U data block at a memory location currently indicated by the U/V write pointer. Then, the compression module updates the U/V write pointer, depending upon the size of the compressed U data block, to indicate a next available memory location in the U/V sequence in the data buffer. The compression module then stores the compressed V data block at a memory location currently indicated by the U/V write pointer. The compression module next updates the U/V write pointer, depending upon the size of the compressed V data block, to indicate a next available memory location in the U/V sequence in the data buffer.

Finally, the compression module determines whether more sets of U/V data blocks remain in the current frame of image data. If more U/V data blocks remain, then the reverse write procedure may return to compress and store the additional U/V data blocks. The reverse write procedure may then terminate. For at least the foregoing reasons, the present invention therefore provides an improved system and method for effectively utilizing a memory device in a compressed domain.

DETAILED DESCRIPTION

The present invention relates to an improvement in display controller systems. The following description is presented to enable one of ordinary skill in the art to make and use the invention, and is provided in the context of a patent application and its requirements. Various modifications to the embodiments disclosed herein will be apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively storing compressed information in an electronic device, and includes a memory device coupled to the electronic device for storing the compressed information. A compression module sequentially performs a forward write procedure to store first components of the compressed information. The forward write procedure begins at a top location of the memory device. The compression module concurrently performs a reverse write procedure to store second components and third components of the compressed information sequentially in an interlaced configuration. The reverse write procedure begins at a bottom location of the memory device.

Figure 1:
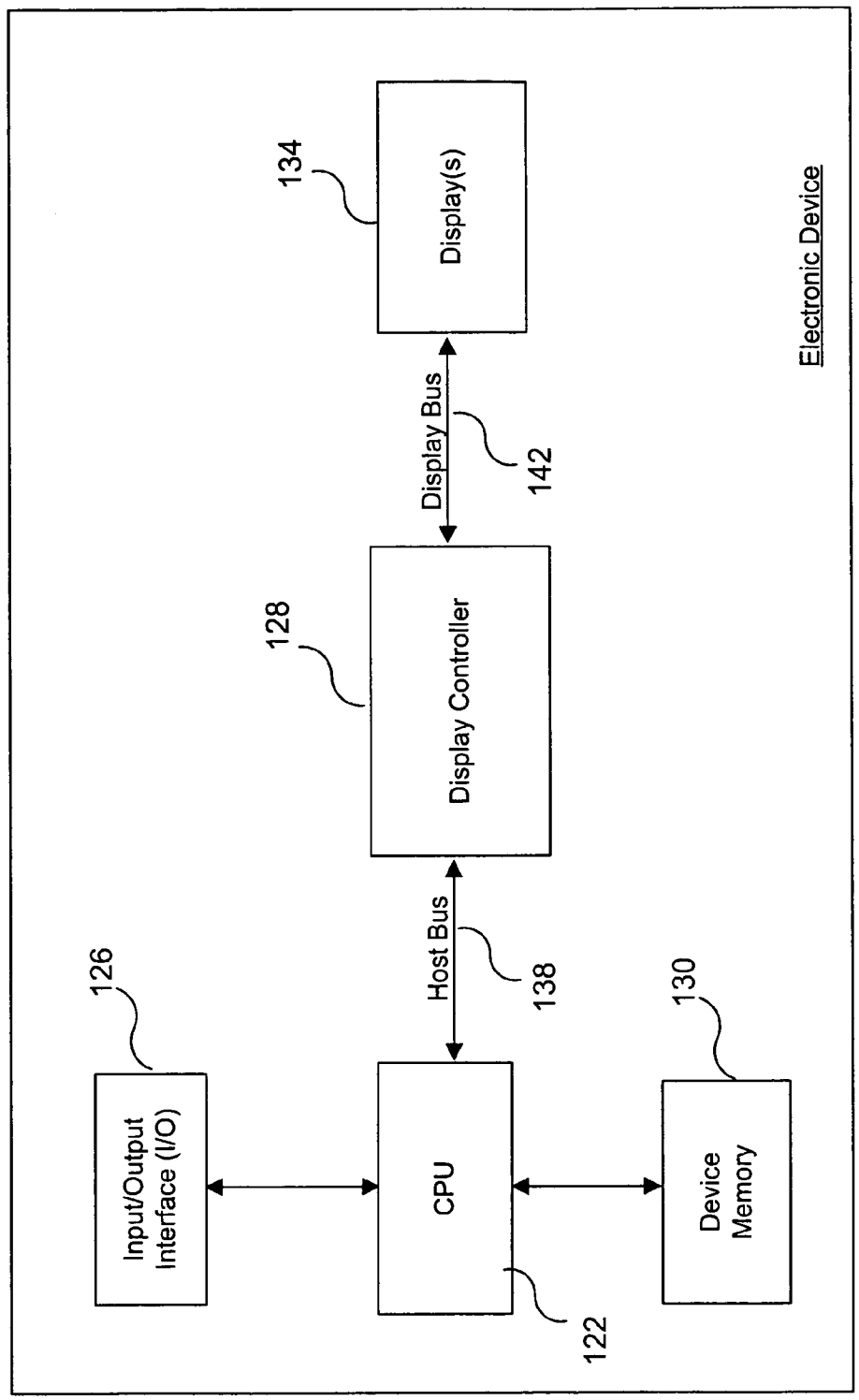
FIG. 1 is a block diagram for one embodiment of an electronic device, in accordance with the present invention.

Referring now to FIG. 1, a block diagram for one embodiment of an electronic device 110 is shown, according to the present invention. The FIG. 1 embodiment includes, but is not limited to, a central processing unit (CPU) 122, an input/output interface (I/O) 126, a display controller 128, a device memory 130, and one or more display(s) 134. In alternate embodiments, electronic device 110 may include elements or functionalities in addition to, or instead of, certain of the elements or functionalities discussed in conjunction with the FIG. 1 embodiment.

In the FIG. 1 embodiment, CPU 122 may be implemented as any appropriate and effective processor device or microprocessor to thereby control and coordinate the operation of electronic device 110 in response to various software program instructions. In the FIG. 1 embodiment, device memory 130 may comprise any desired storage-device configurations, including, but not limited to, random access memory (RAM), read-only memory (ROM), and storage devices such as removable memory or hard disk drives. In the FIG. 1 embodiment, device memory 130 may include, but is not limited to, a device application of program instructions that are executed by CPU 122 to perform various functions and operations for electronic device 110. The particular nature and functionality of the device application typically varies depending upon factors such as the type and specific use of the corresponding electronic device 110.

In the FIG. 1 embodiment, the foregoing device application may include program instructions for allowing CPU 122 to provide image data and corresponding transfer and display information via host bus 138 to display controller 128. In accordance with the present invention, display controller 128 then responsively provides the received image data via display bus 142 to at least one of the display(s) 134 of electronic device 110. In the FIG. 1 embodiment, input/output interface (I/O) 126 may include one or more interfaces to receive and/or transmit any required types of information to or from electronic device 110. Input/output interface 126 may include one or more means for allowing a device user to communicate with electronic device 110. In addition, various external electronic devices may communicate with electronic device 110 through I/O 126. For example, a digital imaging device, such as a digital camera, may utilize input/output interface 126 to provide captured image data to electronic device 110.

In the FIG. 1 embodiment, electronic device 110 may advantageously utilize display controller 128 for efficiently managing various operations and functionalities relating to display(s) 134. The implementation and functionality of display controller 128 is further discussed below in conjunction with FIGS. 2-4 and 6-8. In the FIG. 1 embodiment, electronic device 110 may be implemented as any desired type of electronic device or system. For example, in certain embodiments, electronic device 110 may alternately be implemented as a cellular telephone, a personal digital assistant device, an electronic imaging device, or a computer device. Various embodiments for the operation and utilization of electronic device 110 are further discussed below in conjunction with FIGS. 2-8.

Figure 2:
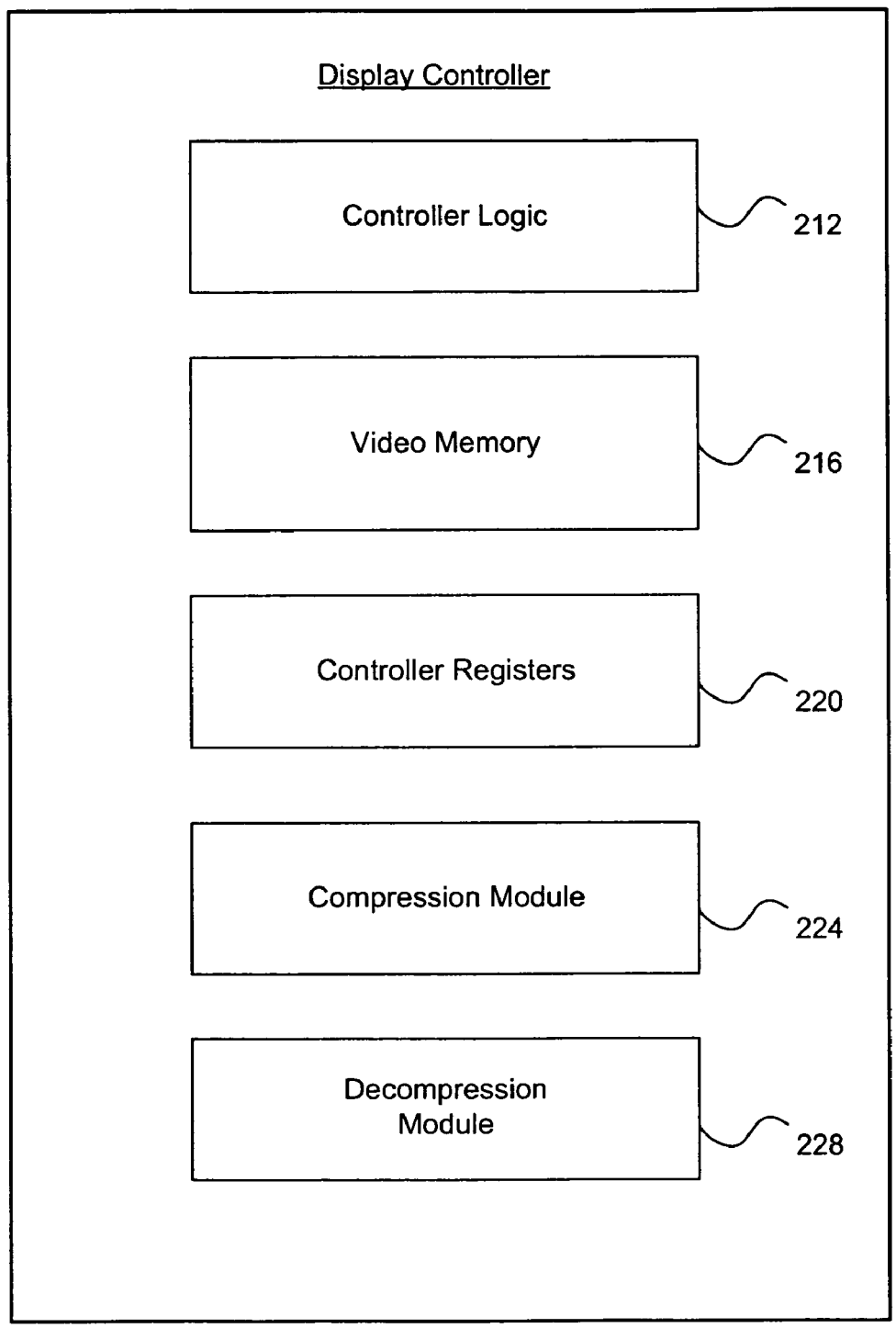
FIG. 2 is a block diagram for one embodiment of the display controller of FIG. 1, in accordance with the present invention.

Referring now to FIG. 2, a block diagram for one embodiment of the FIG. 1 display controller 128 is shown, in accordance with the present invention. The FIG. 2 embodiment includes, but is not limited to, controller logic 212, video memory 216, controller registers 220, a compression module 224, and a decompression module 228. In alternate embodiments, display controller 128 may include elements or functionalities in addition to, or instead of, certain of the elements or functionalities discussed in conjunction with the FIG. 2 embodiment.

In the FIG. 2 embodiment, display controller 128 may be implemented as an integrated circuit device that accepts image data and corresponding transfer and display information from CPU 122 (FIG. 1). Display controller 128 then automatically provides the received image data to display 134 of electronic device 110 in an appropriate and efficient manner for displaying to a device user. In the FIG. 2 embodiment, controller logic 212 manages and coordinates the overall operation of display controller 128.

In the FIG. 2 embodiment, display controller 128 may utilize controller registers 220 to store various types of configuration, control and status information. In the FIG. 2 embodiment, display controller 128 may utilize compression module 224 to compress and write various types of information and input data into video memory 216 during corresponding compression operations. Similarly, display controller 128 may utilize decompression module 228 to read and decompress various types of information and output data from video memory 216 during corresponding decompression operations. In accordance with the present invention, display controller 128 is further discussed below in conjunction with FIGS. 3-4 and 6-8.

Figure 3:
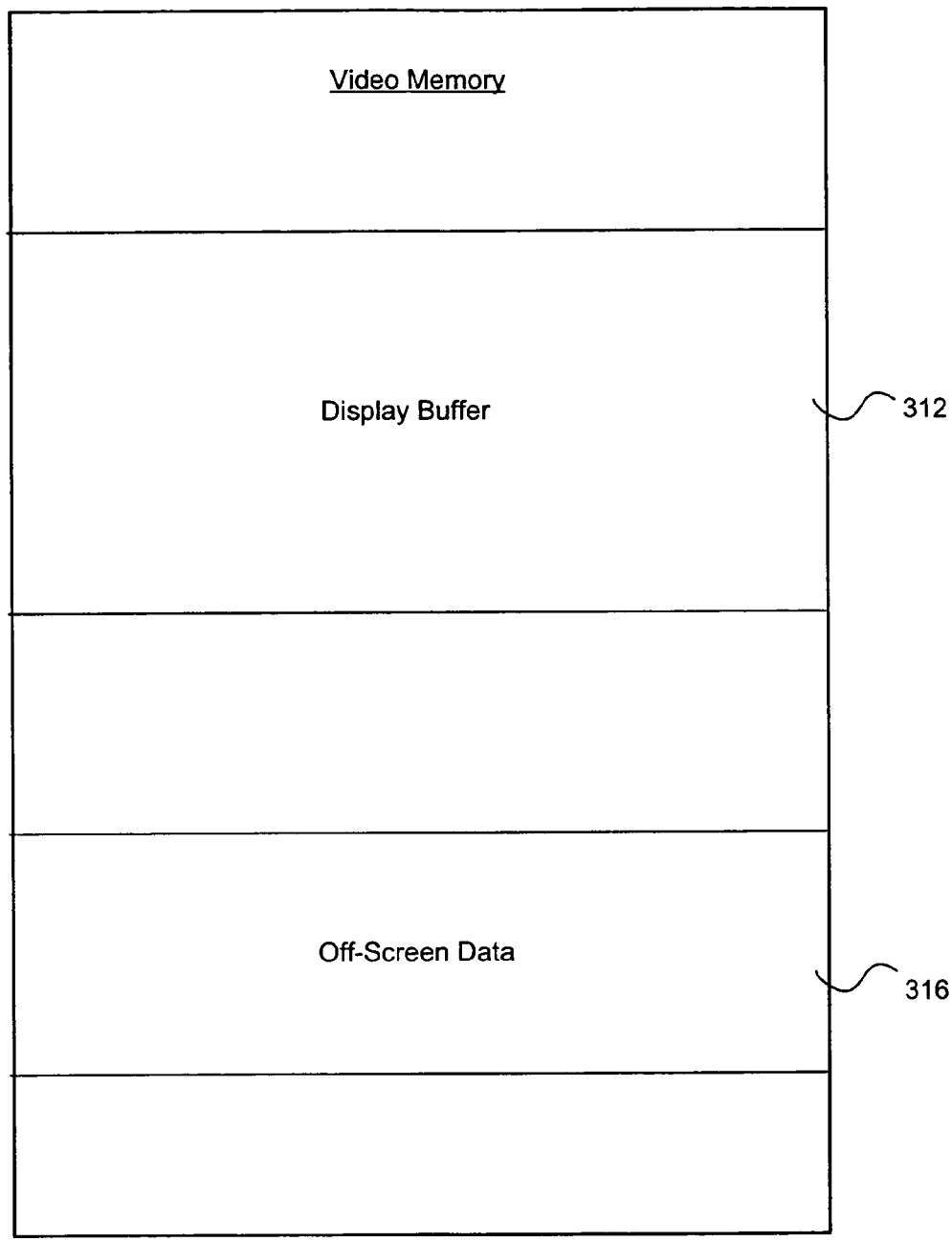
FIG. 3 is a block diagram for one embodiment of the video memory of FIG. 2, in accordance with the present invention.

Referring now to FIG. 3, a block diagram for one embodiment of the FIG. 2 video memory 216 is shown, in accordance with the present invention. In the FIG. 3 embodiment, video memory 216 includes, but is not limited to, at least one display buffer 312 and off-screen data 316. In alternate embodiments, video memory 216 may include elements and functionalities in addition to, or instead of, certain of the elements and functionalities discussed in conjunction with the FIG. 3 embodiment.

In the FIG. 3 embodiment, video memory 216 may be implemented by utilizing any effective types of memory devices or configurations. For example, in certain embodiments, video memory 216 may be implemented as a random-access memory (RAM) device. In the FIG. 3 embodiment, compression module 224 or another appropriate source writes image data into display buffer 312 for subsequent transfer by display controller 128 to display 134 of electronic device 110 for viewing by a device user.

In the FIG. 3 embodiment, off-screen data 316 may include any appropriate type of information or data that is not intended for presentation upon display 134 of electronic device 10. For example, off-screen data 316 may be utilized to cache certain fonts or other objects for use by display controller 128. In accordance with the present invention, various techniques for effectively utilizing display buffer 312 are further discussed below in conjunction with FIGS. 6-8.

Figure 4:
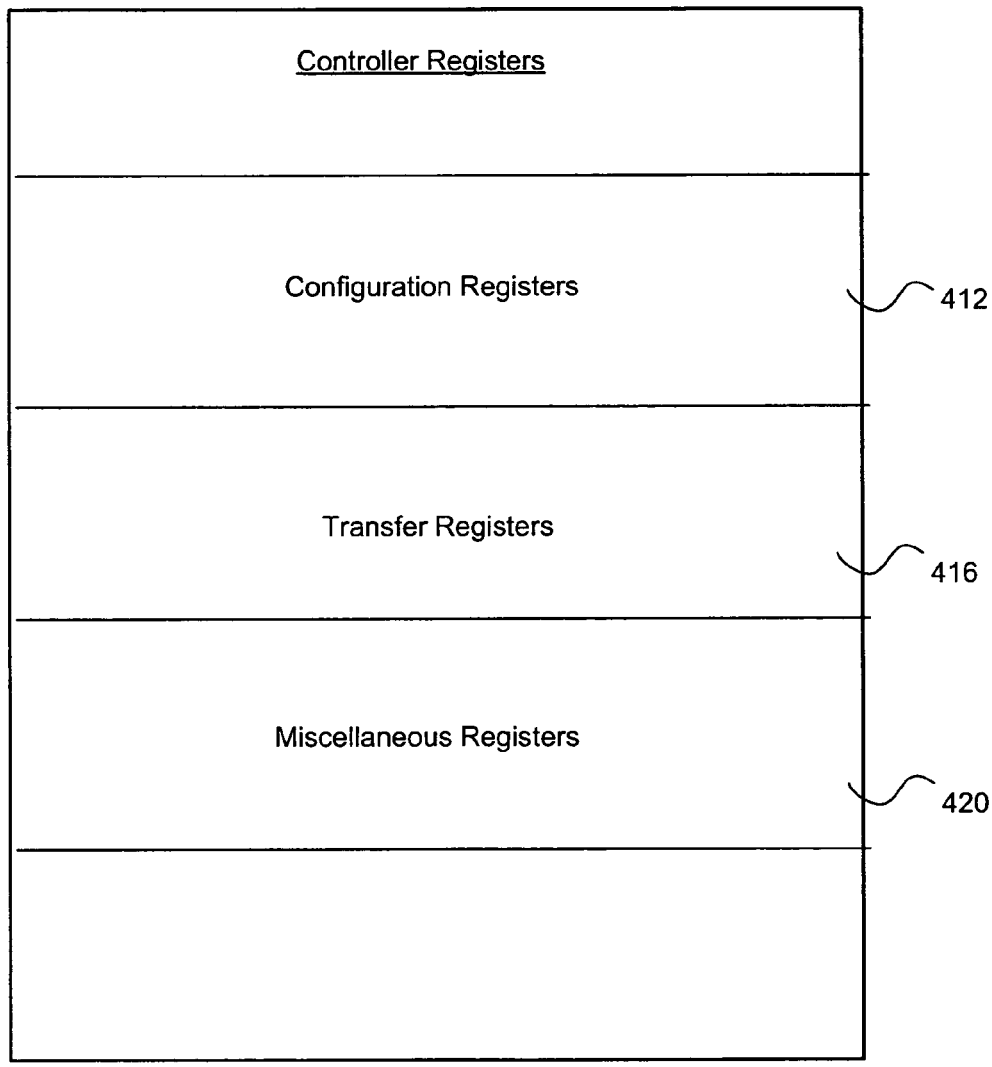
FIG. 4 is a block diagram for one embodiment of the controller registers of FIG. 2, in accordance with the present invention.

Referring now to FIG. 4, a block diagram for one embodiment of the FIG. 2 controller registers 220 is shown, in accordance with the present invention. In the FIG. 4 embodiment, controller registers 220 include, but are not limited to, configuration registers 412, transfer registers 416, and miscellaneous registers 420. In alternate embodiments, controller registers 220 may include elements and functionalities in addition to, or instead of, certain of the elements and functionalities discussed in conjunction with the FIG. 4 embodiment.

In the FIG. 4 embodiment, CPU 122 (FIG. 1) or other appropriate entities may write information into controller registers 220 to specify various types of operational parameters and other relevant information for use by configuration logic 212 of display controller 128. In the FIG. 4 embodiment, controller registers 220 may utilize configuration registers 412 for storing various types of information relating to the configuration of display controller 128 and/or display 134 of electronic device 110. For example, configuration registers 220 may specify a display type, a display size, a display frame rate, and various display timing parameters. In the FIG. 4 embodiment, controller registers 220 may utilize transfer registers 416 for storing various types of information relating to transfer operations for providing pixel data from video memory 216 (FIG. 3) to display 134 of electronic device 110. In the FIG. 4 embodiment, controller registers 220 may utilize miscellaneous registers 420 for effectively storing any desired type of information or data for use by display controller 128.

Figure 5:
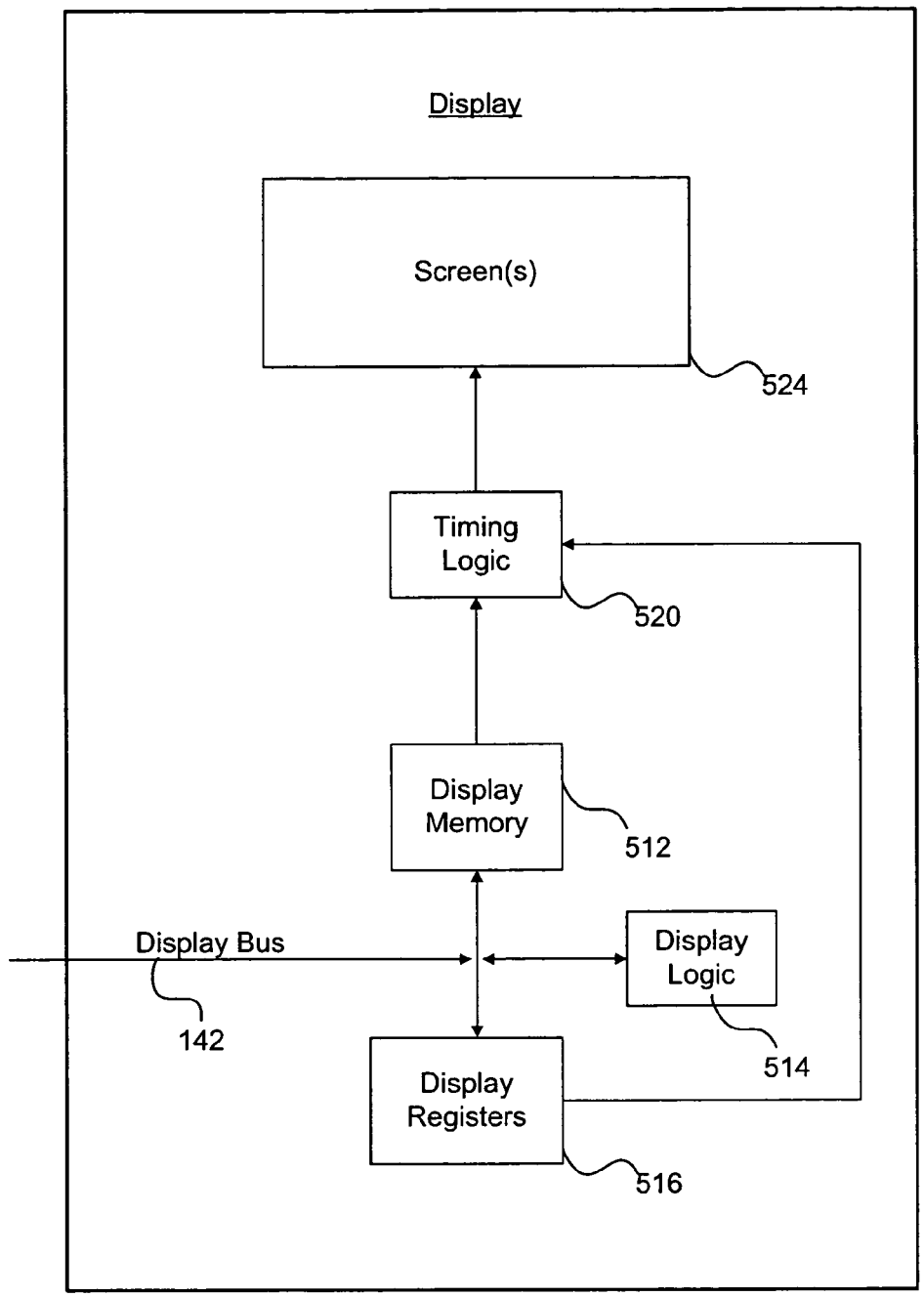
FIG. 5 is a block diagram for one embodiment of the display of FIG. 1, in accordance with the present invention.

Referring now to FIG. 5, a block diagram for one embodiment of the FIG. 1 display 134 is shown, in accordance with the present invention. In the FIG. 5 embodiment, display 134 includes, but is not limited to, a display memory 512, display logic 514, display registers 516, timing logic 520, and one or more screen(s) 524. In alternate embodiments, display 134 may include elements and functionalities in addition to, or instead of, certain of the elements and functionalities discussed in conjunction with the FIG. 5 embodiment.

In the FIG. 5 embodiment, display 134 is implemented as a random-access-memory based liquid-crystal display panel (RAM-based LCD panel). However, in alternate embodiments, display 134 may be implemented by utilizing any type of appropriate display technologies or configurations. In the FIG. 5 embodiment, display controller 128 provides various types of display information to display registers 516 via display bus 142. Display registers 516 may then utilize the received display information for effectively controlling timing logic 520. In the FIG. 5 embodiment, display logic 514 manages and coordinates data transfer and display functions for display 134.

In the FIG. 5 embodiment, display controller 128 provides image data from display buffer 312 (FIG. 3) to display memory 512 via display bus 142. In the FIG. 5 embodiment, display memory 512 is typically implemented as random-access memory (RAM). However, in various other embodiments, any effective types or configurations of memory devices may be utilized to implement display memory 512. In the FIG. 5 embodiment, display memory 512 then advantageously provides the image data received from display controller 128 to one or more screens 524 via timing logic 520 for viewing by a device user of electronic device 110.

Figure 6:
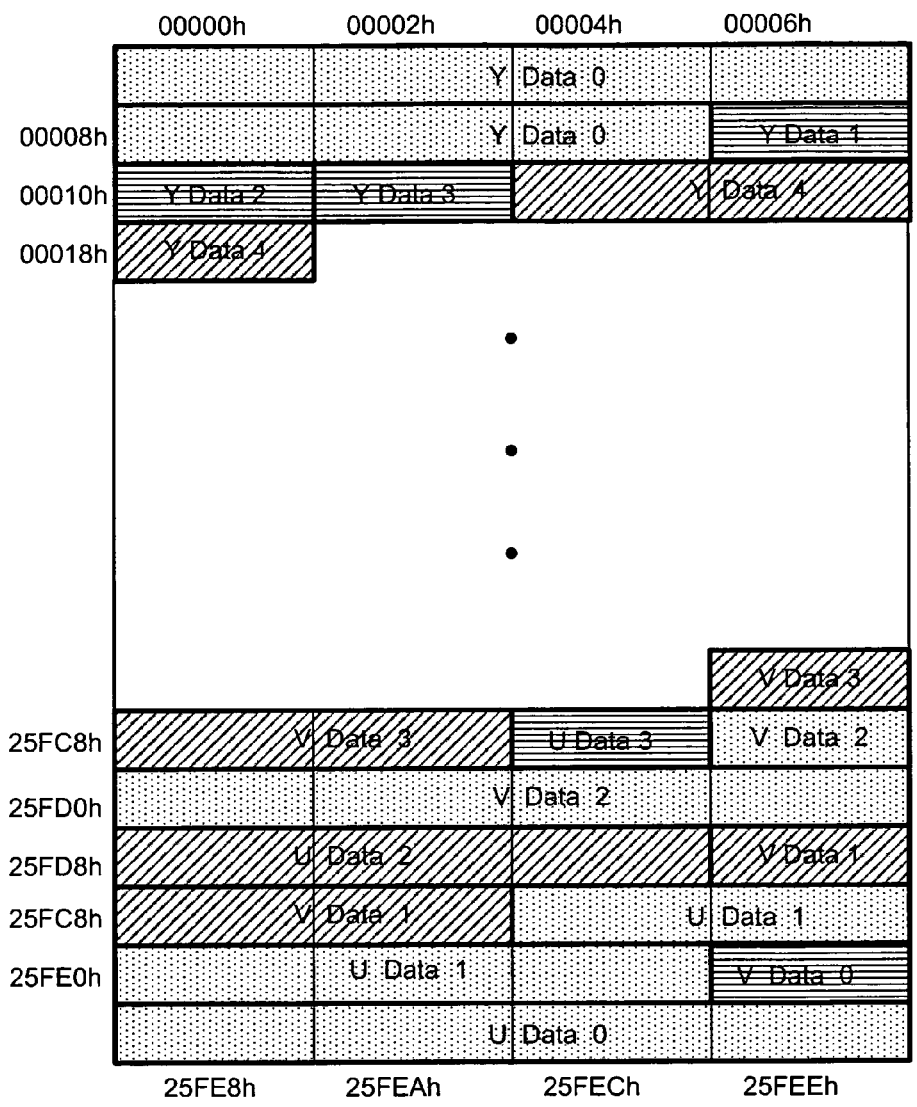
FIG. 6 is a memory map illustrating an exemplary embodiment for storing compressed image data, in accordance with the present invention.

Referring now to FIG. 6, a memory map illustrating an exemplary embodiment for storing data blocks of compressed YUV image data into display buffer 312 (FIG. 3) is shown. The example shown in FIG. 6 is presented for purposes of illustration, and in alternate embodiments, the present invention may utilize different memory devices for storing various other types of data by utilizing configurations and techniques in addition to, or instead of, certain of those configurations and techniques shown in the embodiment of FIG. 6. In the FIG. 6 embodiment, the original uncompressed input data may be implemented in a YUV 4:2:0 format with an 8×4 block size of eight horizontal pixels and four vertical pixels. However, in alternate embodiments, any other appropriate input data format is equally contemplated.

The FIG. 6 memory map shows various blocks of compressed image data that have been compressed from input data blocks by compression module 224 (FIG. 2), and then stored into display buffer 312 (FIG. 3). During the compression procedures, compression module 224 encodes each input data block with a reduced number of compression bits, as compared to the larger number of uncompressed bits that are initially used to represent the input data. In the FIG. 6 embodiment, each horizontal row of display buffer 312 is shown with four sixteen-bit memory locations. However, in alternate embodiments, any desired memory configuration is equally contemplated.

The number of binary compression bits that are used to represent any given block of input data typically depends upon the particular image content of that block. For example, a flat block with little or no variation between pixels may be represented by a minimal number of bits, a binary block with two main levels of pixels may be represented with a moderate number of bits, and a standard block with three or more levels of pixels may be represented with a relatively larger number of bits. In the FIG. 6 memory map of display buffer 312, normal block data is represented by a dotted texture, binary block data is represented by a diagonally-lined texture, and flat block data is represented by a vertically-lined texture. The foregoing block textures are illustrated in the legend found at the bottom of FIG. 6.

After performing the compression procedures, compression module 224 sequentially packs the compressed blocks into display buffer 312. However, because of the different number of bits used to represent individual blocks in a compressed domain, the storage size of each compressed block is not constant. This irregular size of compressed blocks may cause significant difficulty in determining the write/read addresses of given compressed blocks in display buffer 312 because the memory locations are not deterministic.

In the FIG. 6 embodiment, compression module 224 of display controller 128 initially accesses YUV data blocks from CPU 122 (FIG. 1) or other appropriate entity. However, compression module 224 typically receives the individual components of the YUV data blocks on separate input paths. For example, Y data blocks may be provided on a first input path, U data blocks may be provided on a second input path, and V data blocks may be provided on a third input data path. In addition, in the FIG. 6 embodiment, the Y data blocks typically do not directly correspond to the U/V data blocks on a one-to-one basis. In other words, several Y data blocks may be received in succession before a set of U/V data blocks is received. The present invention therefore advantageously handles Y data blocks and U/V data blocks separately.

In accordance with the present invention, compression module 224 performs a forward write procedure to compress and write a series of Y data blocks, starting at the top left location of the FIG. 6 display buffer 312. In addition, compression module 224 concurrently performs a reverse write procedure to compress and write a series of U/V data blocks in an interlaced manner, starting at the bottom right location of the FIG. 6 display buffer 312. In the FIG. 6 embodiment, display buffer 312 is optimally sized to ensure that the forward write procedure of Y data blocks and the reverse write procedure of interlaced U/V data blocks never overwrite each other. In certain embodiments, it is the responsibility of a compression algorithm to guarantee that the forward write procedure and the reverse write procedure never overwrite each other. For example, the compression algorithm may prevent overwriting by adjusting the bit allocation rates for the forward write procedure and/or the reverse write procedure.

In the FIG. 6 example, compression module 224 performs the foregoing forward write procedure by initially writing a normal block, Y Data 0, starting at hexadecimal address 00000h found at the top left of the FIG. 6 display buffer 312. Compression module 224 then proceeds to sequentially write two flat blocks, Y Data 2 and Y Data 3, followed by a binary block, Y Data 4. Compression module 224 may then continue sequentially compressing and writing Y blocks until a current frame of input data has been compressed and stored.

In the FIG. 6 example, compression module 224 concurrently performs the foregoing reverse write procedure by initially writing a normal block, U Data 0, starting at the bottom of the FIG. 6 display buffer 312. Compression module 224 then interlaces a flat block, V Data 0, followed by a normal block, U Data 1, and a binary block, V Data 1. Compression module 224 continues to interlace a binary block, U Data 2, and a normal block, V Data 2, followed by a flat block, U Data 3, and a binary block V Data 3. Compression module 224 may then continue sequentially compressing and interlacing U/V data blocks until a current frame of input data has been compressed and stored.

In accordance with the present invention, decompression module 228 (FIG. 2) or other appropriate entity may then advantageously access display buffer 312 to more easily locate Y data blocks and interlaced U/V data blocks in display buffers 312. The utilization of display buffer 312 is further discussed below in conjunction with FIGS. 7-8.

Figure 7:
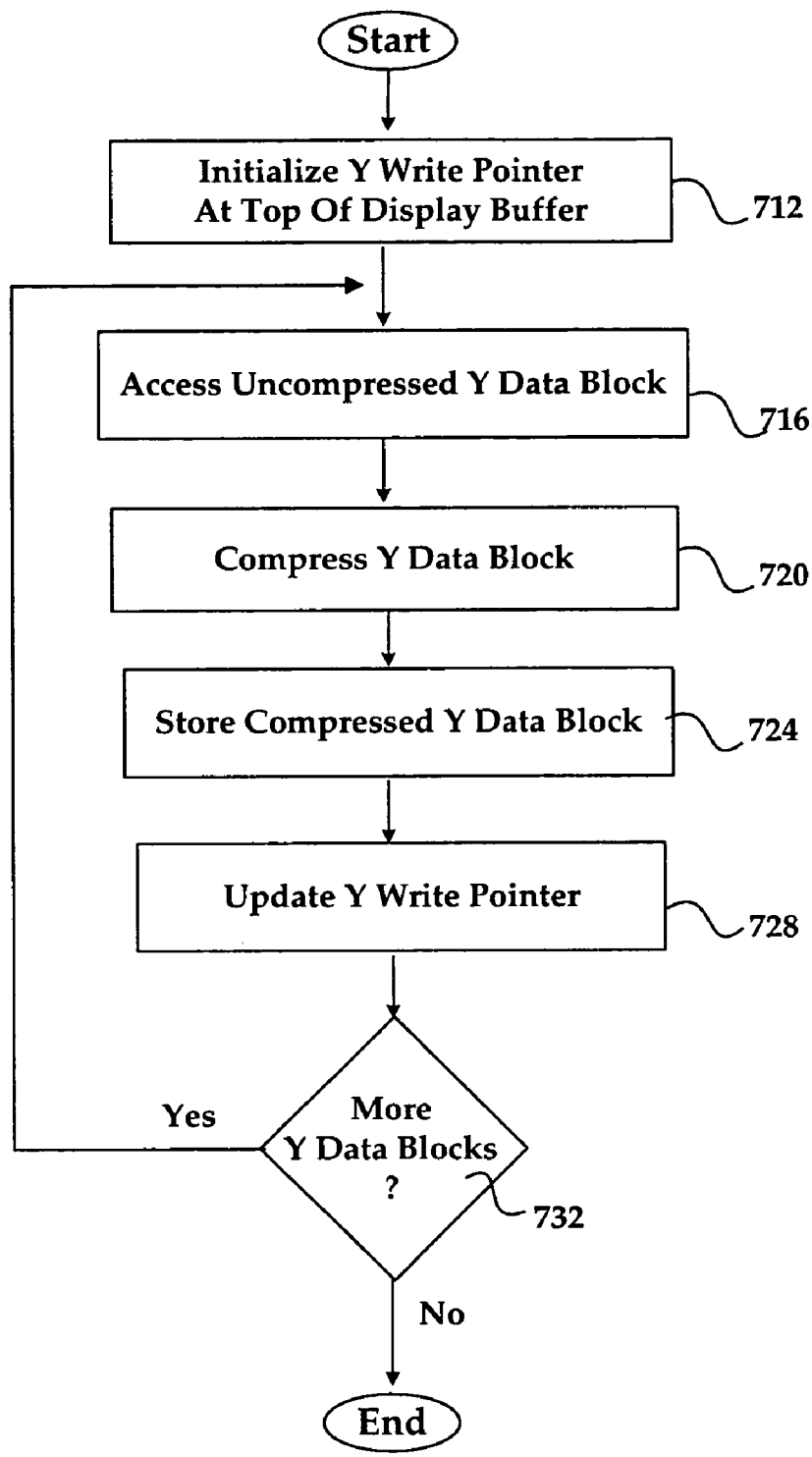
FIG. 7 is a flowchart of method steps for performing a forward write procedure to store compressed Y data blocks, in accordance with one embodiment of the present invention.

Referring now to FIG. 7, a flowchart of method steps is shown for performing a forward write procedure to store compressed Y data blocks in accordance with one embodiment of the present invention. The FIG. 7 flowchart is presented for purposes of illustration, and in alternate embodiments, the present invention may utilize steps and sequences in addition to, or instead of, certain of the steps and sequences discussed in conjunction with the FIG. 7 embodiment. In accordance with the present invention, the following forward write procedure may be performed concurrently with a reverse write procedure discussed below in conjunction with FIG. 8.

In the FIG. 7 embodiment, in step 712, a compression module 224 of a display controller 128 initializes a Y write pointer to a memory location at the top of display buffer 312 (FIG. 6). In step 716, compression module 224 accesses an uncompressed Y data block from any appropriate source. In step 720, compression module 224 performs a compression operation to compress the accessed Y data block received in foregoing step 716.

In step 724, compression module 224 stores the compressed Y data block at the memory location currently indicated by the Y write pointer. Then, in step 728, compression module 224 updates the Y write pointer, depending upon the size of the compressed Y data block stored in foregoing step 724, to indicate the next available memory location in the Y data block sequence in data buffer 312. In step 732, compression module 224 determines whether more Y data blocks remain in the current frame of image data. If more Y data blocks remain, then the FIG. 7 process may return to repeat steps 716 through 728 until all Y data blocks have been compressed and stored. The FIG. 7 process may then terminate.

Figure 8:
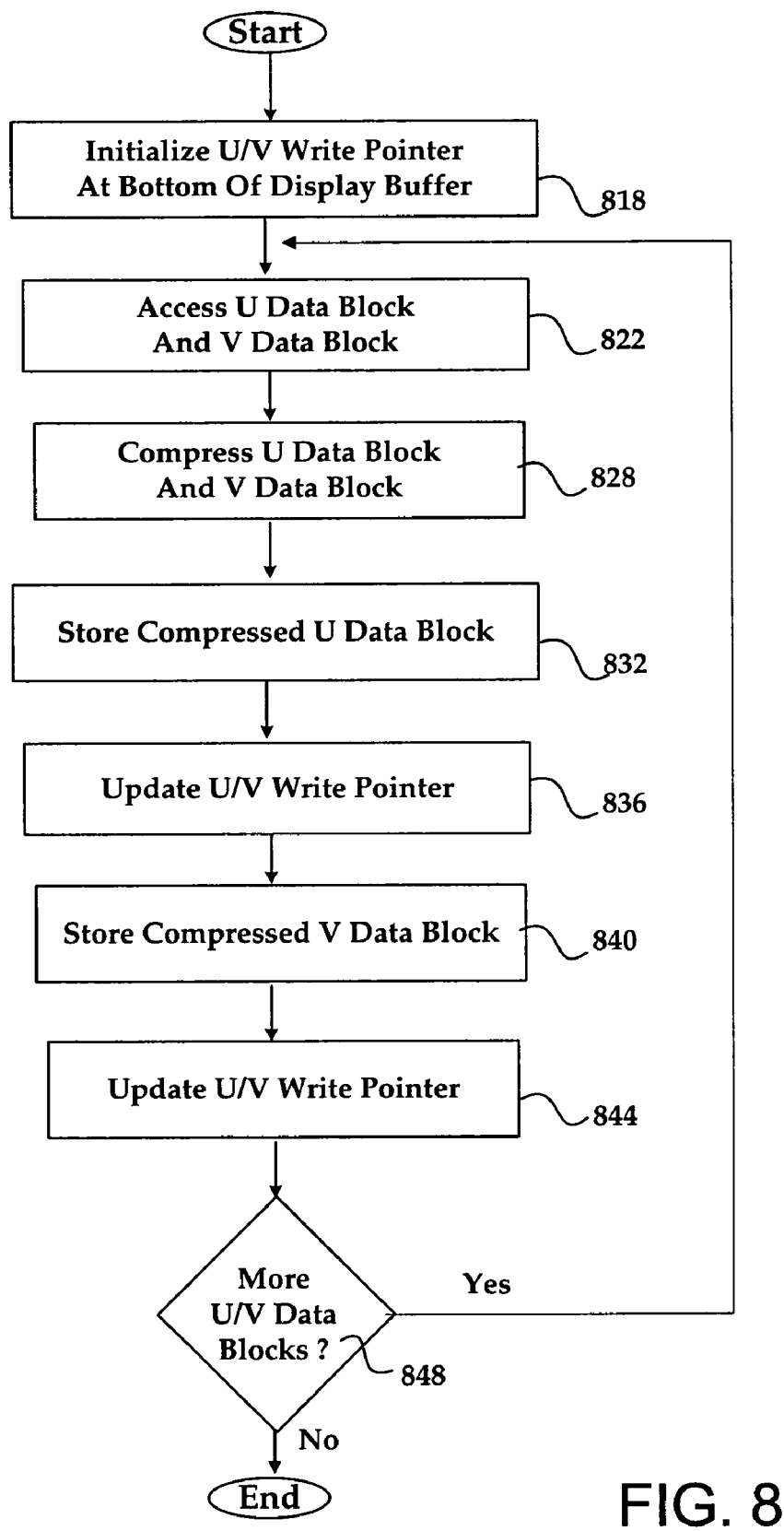
FIG. 8 is a flowchart of method steps for performing a reverse write procedure to store compressed U data blocks and compressed V data blocks, in accordance with one embodiment of the present invention.

Referring now to FIG. 8, a flowchart of method steps is shown for performing a reverse write procedure to store compressed U data blocks and compressed V data blocks in accordance with one embodiment of the present invention. The FIG. 8 flowchart is presented for purposes of illustration, and in alternate embodiments, the present invention may utilize steps and sequences in addition to, or instead of, certain of the steps and sequences discussed in conjunction with the FIG. 8 embodiment. In accordance with the present invention, the following reverse write procedure may be performed concurrently with the forward write procedure discussed above in conjunction with FIG. 7.

In the FIG. 8 embodiment, in step 818, a compression module 224 of a display controller 128 initializes a U/V write pointer to a memory location at the bottom of display buffer 312 (FIG. 6). In step 822, compression module 224 accesses an uncompressed U data block and an uncompressed V data block from any appropriate source. In step 828, compression module 224 performs compression operations to compress the accessed U data block and the accessed V data block received in foregoing step 822.

In step 832, compression module 224 stores the compressed U data block at the memory location currently indicated by the U/V write pointer. Then, in step 836, compression module 224 updates the U/V write pointer, depending upon the size of the compressed U data block stored in foregoing step 832, to indicate the next available memory location in the U/V sequence in data buffer 312.

In step 840, compression module 224 then stores the compressed V data block at the memory location currently indicated by the U/V write pointer. Then, in step 844, compression module 224 updates the U/V write pointer, depending upon the size of the compressed V data block stored in foregoing step 840, to indicate the next available memory location in the U/V sequence in data buffer 312.

In step 848, compression module 224 determines whether more sets of U/V data blocks remain in the current frame of image data. If more U/V data blocks remain, then the FIG. 8 process may return to repeat steps 822 through 844 until all U/V data blocks have been compressed and stored. The FIG. 8 process may then terminate. For at least the foregoing reasons, the present invention therefore provides an improved system and method for effectively utilizing a memory device in a compressed domain.

The invention has been explained above with reference to certain preferred embodiments. Other embodiments will be apparent to those skilled in the art in light of this disclosure. For example, the present invention may be implemented using certain configurations and techniques other than those described in the embodiments above. Additionally, the present invention may effectively be used in conjunction with systems other than those described above as the preferred embodiments. Therefore, these and other variations upon the foregoing embodiments are intended to be covered by the present invention, which is limited only by the appended claims.

What is claimed is:

1. A system for effectively storing compressed information in an electronic device, comprising:

a memory device coupled to said electronic device for storing said compressed information; and a compression module that sequentially performs a forward write procedure to store first components of said compressed information, said forward write procedure beginning at a top location of said memory device, said compression module concurrently performing a reverse write procedure to separately store second components and third components of said compressed information sequentially in an interlaced configuration, said reverse write procedure beginning at a bottom location of said memory device, said first components, said second components, and said third components including image data.

2. The system of claim 1 wherein said compression module is implemented in a display controller that coordinates providing said image data to a display device, said display controller being implemented as an integrated circuit device that functions as an interface between a central processing unit and said display device, said memory device being implemented as a display buffer coupled to said display controller device.

3. The system of claim 2 wherein said compressed information represents compressed image data derived from uncompressed image data in a YUV 4:2:0 format, said first components being Y data blocks, said second components being U data blocks, and said third components being V data blocks.

4. The system of claim 1 wherein said compressed information in said memory device includes compressed data blocks of irregular size, said compressed data blocks being stored into said memory device in a non-deterministic manner, said memory device being sized to prevent overwriting said first components, said second components, and said third components.

5. The system of claim 1 wherein said compressed information includes flat blocks with little variation between image pixels, binary blocks with two main levels of said image pixels, and standard blocks with three or more levels of said image pixels.

6. The system of claim 1 wherein said compression module begins said forward write procedure by initializing a Y write pointer at said top location of said memory device, said forward write procedure occurring concurrently with said reverse write procedure.

7. The system of claim 6 wherein said compression module accesses an uncompressed Y data block, said compression module then performing a compression operation to produce a compressed Y data block.

8. The system of claim 7 wherein said compression module stores said compressed Y data block at a current memory location indicated by said Y write pointer.

9. The system of claim 8 wherein said compression module updates said Y write pointer depending upon a memory allocation for said compressed Y data block, said Y write pointer then indicating a first next available memory location in a Y data block sequence in said memory device.

10. The system of claim 9 wherein said compression module determines whether additional input Y data blocks remain in a current frame of input image data, said compression module sequentially compressing and storing said additional input Y data blocks from said current frame.

11. The system of claim 1 wherein said compression module begins said reverse write procedure by initializing a U/V write pointer at said bottom location of said memory device, said reverse write procedure occurring concurrently with said forward write procedure.

12. The system of claim 11 wherein said compression module accesses an uncompressed U data block and an uncompressed V data block from an input data source.

13. The system of claim 12 wherein said compression module performs compression operations to produce a compressed U data block and a compressed V data block.

14. The system of claim 13 wherein said compression module stores said compressed U data block at a first current memory location indicated by said U/V write pointer.

15. The system of claim 14 wherein said compression module updates said U/V write pointer depending upon a first memory allocation for said compressed U data block, said U/V write pointer then indicating a next available memory location in a U/V data block sequence in said memory device.

16. The system of claim 15 wherein said compression module stores said compressed V data block at a second current memory location indicated by said U/V write pointer.

17. The system of claim 16 wherein said compression module updates said U/V write pointer depending upon a second memory allocation for said compressed U data block, said U/V write pointer then indicating a second next available memory location in said U/V data block sequence in said memory device.

18. The system of claim 17 wherein said compression module determines whether additional input U/V data blocks remain in a current frame of input image data, said compression module sequentially compressing and storing said additional input U/V data blocks from said current frame.

19. The system of claim 1 wherein said compression module prevents overwriting said first components, said second components, and said third components by adjusting bit allocation rates for at least one of said forward write procedure and said reverse write procedure.

20. A method for effectively storing compressed information in an electronic device, comprising:
storing said compressed information in a memory device coupled to said electronic device;
performing a forward write procedure with a compression module to sequentially store first components of said compressed information, said forward write procedure beginning at a top location of said memory device; and
performing a reverse write procedure with said compression module to concurrently store second components and third components of said compressed information separately and sequentially in an interlaced configuration, said reverse write procedure beginning at a bottom location of said memory device, said first components, said second components, and said third components including image data.

21. A compression module for effectively storing compressed information in a memory device, the compression module sequentially performing a forward write procedure to store first components of the compressed information, the forward write procedure beginning at a top location of the memory device, the compression module concurrently performing a reverse write procedure to separately store second components and third components of the compressed information sequentially in an interlaced configuration, the reverse write procedure beginning at a bottom location of the memory device, the first components, the second components, the said third components including image data.

* * * * *